United States Patent
Albers et al.

(10) Patent No.: US 8,753,073 B2
(45) Date of Patent: Jun. 17, 2014

(54) TURBINE SHROUD SEALING APPARATUS

(75) Inventors: Joseph Charles Albers, Fort Wright, KY (US); Mark Willard Marusko, Springboro, OH (US); Barry Allan Wilson, Broken Arrow, OK (US); Aaron Michael Dziech, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 870 days.

(21) Appl. No.: 12/821,599

(22) Filed: Jun. 23, 2010

(65) Prior Publication Data

US 2011/0318171 A1 Dec. 29, 2011

(51) Int. Cl.
*F01D 9/04* (2006.01)
*F01D 11/00* (2006.01)

(52) U.S. Cl.
USPC ............... 415/139; 415/173.3; 415/174.2

(58) Field of Classification Search
USPC ............ 415/170.1, 173.1, 173.3, 174.2, 139, 415/209.2, 209.3
See application file for complete search history.

(56) References Cited

U.S. PATENT DOCUMENTS

| | | | |
|---|---|---|---|
| 5,074,748 A | 12/1991 | Hagle | |
| 5,154,577 A | 10/1992 | Kellock et al. | |
| 5,188,507 A | 2/1993 | Sweeney | |
| 5,601,402 A * | 2/1997 | Wakeman et al. | 415/173.2 |
| 5,655,876 A | 8/1997 | Rock et al. | |
| 6,290,459 B1 | 9/2001 | Correia | |
| 6,340,285 B1 | 1/2002 | Gonyou et al. | |
| 6,413,042 B2 | 7/2002 | Correia | |
| 6,503,051 B2 | 1/2003 | Predmore | |
| 6,758,653 B2 * | 7/2004 | Morrison | 415/173.4 |
| 6,814,538 B2 * | 11/2004 | Thompson | 415/116 |
| 7,201,559 B2 * | 4/2007 | Gendraud et al. | 415/173.1 |
| 7,938,621 B1 * | 5/2011 | Balsdon et al. | 415/173.1 |
| 8,246,299 B2 * | 8/2012 | Razzell et al. | 415/173.1 |
| 2004/0141838 A1 * | 7/2004 | Thompson | 415/209.3 |
| 2005/0249584 A1 | 11/2005 | Amiot et al. | |
| 2008/0206046 A1 * | 8/2008 | Razzell et al. | 415/173.1 |
| 2011/0293410 A1 * | 12/2011 | Marusko et al. | 415/173.1 |
| 2011/0318171 A1 * | 12/2011 | Albers et al. | 415/173.1 |
| 2012/0082540 A1 * | 4/2012 | Dziech et al. | 415/173.1 |
| 2012/0107122 A1 * | 5/2012 | Albers et al. | 416/179 |
| 2012/0171023 A1 * | 7/2012 | Albers et al. | 415/173.1 |
| 2012/0171027 A1 * | 7/2012 | Albers et al. | 415/208.1 |
| 2013/0004306 A1 * | 1/2013 | Albers et al. | 415/200 |
| 2013/0156550 A1 * | 6/2013 | Franks et al. | 415/126 |

FOREIGN PATENT DOCUMENTS

| | | | |
|---|---|---|---|
| EP | 1965030 A2 | 9/2008 | |
| EP | 2105581 A2 | 9/2009 | |
| JP | 63239301 A * | 10/1988 | F01D 11/08 |

OTHER PUBLICATIONS

Great Britain Search Report dated Aug. 17. 2011 issued in connection with responding GB Application No. 1106682.6.

\* cited by examiner

*Primary Examiner* — Edward Look
*Assistant Examiner* — Christopher R Legendre
(74) *Attorney, Agent, or Firm* — William Scott Andes; Trego, Hines & Ladenheim, PLLC

(57) ABSTRACT

A turbine shroud sealing apparatus for a gas turbine engine includes: (a) an arcuate shroud segment comprising a low-ductility material and having a cross-sectional shape defined by opposed forward and aft walls, and opposed inner and outer walls, the walls extending between opposed first and second end faces of the segment; and (b) a first seal assembly received in at least one slot formed in the first end face, the first seal assembly comprising one or more spline seals which protrude from the first end face and which are arranged to define a continuous sealing surface around the perimeter of the first end face.

6 Claims, 3 Drawing Sheets

TURBINE SHROUD SEALING APPARATUS

STATEMENT REGARDING FEDERALLY SPONSORED RESEARCH AND DEVELOPMENT

The U.S. Government may have certain rights in this invention pursuant to contract number F33615-03D-2352 awarded by the Air Force Research Laboratory, Wright-Patterson Air Force Base, Ohio.

BACKGROUND OF THE INVENTION

This invention relates generally to gas turbine engines, and more particularly to apparatus and methods for sealing shrouds made of a low-ductility material in the turbine sections of such engines.

A typical gas turbine engine includes a turbomachinery core having a high pressure compressor, a combustor, and a high pressure turbine in serial flow relationship. The core is operable in a known manner to generate a primary gas flow. The high pressure turbine (also referred to as a gas generator turbine) includes one or more rotors which extract energy from the primary gas flow. Each rotor comprises an annular array of blades or buckets carried by a rotating disk. The flowpath through the rotor is defined in part by a shroud, which is a stationary structure which circumscribes the tips of the blades or buckets. These components operate in an extremely high temperature environment, and must be cooled by air flow to ensure adequate service life. Typically, the air used for cooling is extracted (bled) from the compressor. Bleed air usage negatively impacts specific fuel consumption ("SFC") and is should generally be minimized.

It has been proposed to replace metallic shroud structures with materials having better high-temperature capabilities, such as ceramic matrix composites (CMCs). These materials have unique mechanical properties that must be considered during design and application of an article such as a shroud segment. For example, CMC materials have relatively low tensile ductility or low strain to failure when compared with metallic materials. Also, CMCs have a coefficient of thermal expansion ("CTE") in the range of about 1.5-5 microinch/inch/degree F., significantly different from commercial metal alloys used as supports for metallic shrouds. Such metal alloys typically have a CTE in the range of about 7-10 microinch/inch/degree F.

CMC shrouds may be segmented to lower stresses from thermal growth and allow the engine's clearance control system to work effectively. The segment end faces or "slash" faces can have end gaps at operating conditions, with CMC shrouds potentially having larger gaps than comparable metal shrouds. Because of the slash face gaps, seals must be used to limit the leakage flow and protect the back flow margin of the shroud.

One type of segmented CMC shroud incorporates a "box" design eliminating the conventional shroud hangers which are used to mount prior art metallic turbine shrouds. In prior art practice, the shroud hanger is usually used to meter cooling air flow supplied to the shroud by removing a significant portion of the cooling air pressure. Because a box shroud will not have a shroud hanger, the outboard portion of the shroud could interface with very high air pressures.

BRIEF SUMMARY OF THE INVENTION

These and other shortcomings of the prior art are addressed by the present invention, which provides a turbine shroud sealing apparatus providing a continuous perimeter sealing surface between turbine shroud end gaps.

According to one aspect of the invention, a turbine shroud sealing apparatus for a gas turbine engine includes: (a) an arcuate shroud segment comprising a low-ductility material and having a cross-sectional shape defined by opposed forward and aft walls, and opposed inner and outer walls, the walls extending between opposed first and second end faces of the segment; and (b) a first seal assembly received in at least one slot formed in the first end face, the first seal assembly comprising one or more spline seals which protrude from the first end face and which are arranged to define a continuous sealing surface around the perimeter of the first end face.

According to another aspect of the invention, a turbine shroud apparatus for a gas turbine engine having a centerline axis includes: (a) an annular stationary structure; (b) an annular turbine shroud mounted within the stationary structure, comprising a plurality of arcuate shroud segments, each shroud segment comprising a low-ductility material and having opposed forward and aft walls, and opposed inner and outer walls, each of the walls extending between opposite end faces, wherein the shroud segments are disposed with mating end faces in close proximity so as to define end gaps between each facing pair of end faces; and (c) a seal assembly disposed in each of the end gaps, the seal assembly comprising one or more spline seals which are arranged to define a continuous sealing surface around the perimeters of the mating end faces.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
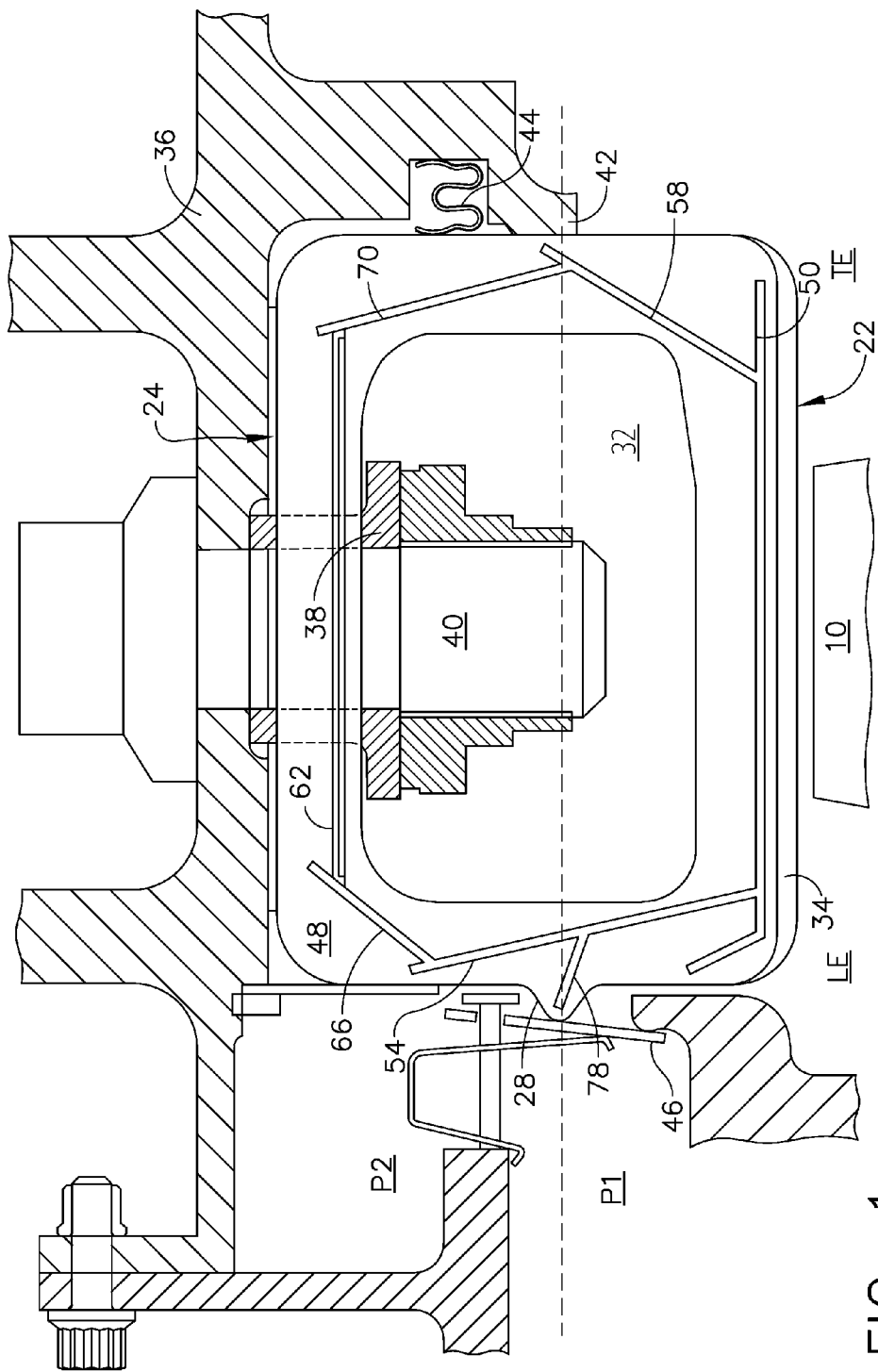
FIG. 1 is a schematic cross-sectional view of a portion of a turbine section of a gas turbine engine, incorporating a shroud sealing apparatus constructed in accordance with an aspect of the present invention.

Referring to the drawings wherein identical reference numerals denote the same elements throughout the various views, FIG. 1 depicts a small portion of a high pressure turbine, which is part of a gas turbine engine of a known type. The function of the high pressure turbine is to extract energy from high-temperature, pressurized combustion gases from an upstream combustor (not shown) and to convert the energy to mechanical work, in a known manner. The high pressure turbine drives an upstream compressor (not shown) through a shaft so as to supply pressurized air to the combustor.

In the illustrated example, the engine is a turbofan engine and a low pressure turbine would be located downstream of the gas generator turbine and coupled to a shaft driving a fan. However, the principles described herein are equally applicable to turbojet and turboshaft engines, as well as turbine engines used for other vehicles or in stationary applications.

The high pressure turbine includes a rotor that rotates about a centerline axis of the engine and carries an array of airfoil-shaped turbine blades 10. A shroud comprising a plurality of arcuate shroud segments 12 is arranged so as to closely surround the turbine blades 10 and thereby define the outer radial flowpath boundary for the hot gas stream flowing through the rotor.

Figure 2:
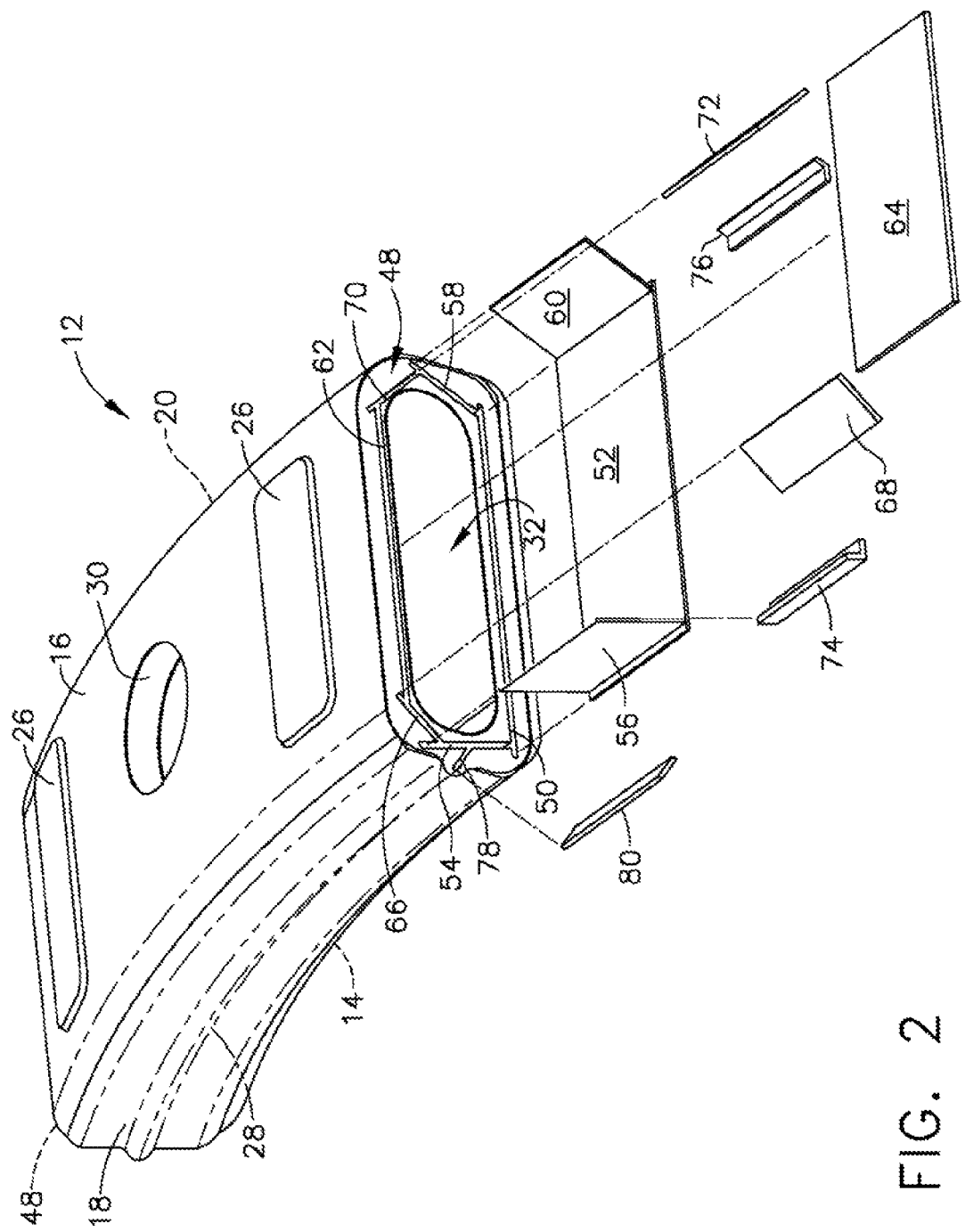
FIG. 2 is an exploded perspective view of a turbine shroud constructed in accordance with an aspect of the present invention, shown with several spline seals.

As seen in FIG. 2, each shroud segment 12 has a generally rectangular or "box"-shaped hollow cross-sectional shape defined by opposed inner and outer walls 14 and 16, and forward and aft walls 18 and 20. In the illustrated example radiused transitions are provided between the walls, but sharp or square-edged transitions may be used as well. The shroud segment 12 has a radially inner flowpath surface 22 and a radially outer back surface 24 (best seen in FIG. 1). The back surface 24 incorporates one or more protruding pads 26 which are used for alignment purposes. An optional rail 28 with a rounded leading edge extends forward from the forward wall 14. A mounting hole 30 passes through the outer wall 16. A shroud cavity 32 is defined within the walls 14, 16, 18, and 20.

The shroud segments 12 are constructed from a ceramic matrix composite (CMC) material of a known type. Generally, commercially available CMC materials include a ceramic type fiber for example SiC, forms of which are coated with a compliant material such as Boron Nitride (BN). The fibers are carried in a ceramic type matrix, one form of which is Silicon Carbide (SiC). Typically, CMC type materials have a room temperature tensile ductility of no greater than about 1%, herein used to define and mean a low tensile ductility material. Generally CMC type materials have a room temperature tensile ductility in the range of about 0.4 to about 0.7%. This is compared with metals having a room temperature tensile ductility of at least about 5%, for example in the range of about 5 to about 15%. The shroud 12 could also be constructed from other low-ductility, high-temperature-capable materials.

The flowpath surface 22 of the shroud 12 incorporates a layer of an abradable or rub-tolerant material 34 of a known type suitable for use with CMC materials. This layer is sometimes referred to as a "rub coat". In the illustrated example, the abradable material 34 is about 0.51 mm (0.020 in.) to about 0.76 mm (0.030 in.) thick.

The shroud segments 12 are mounted to a stationary structure which in this example is part of a turbine case 36 by mechanical means. A spacer 38 is disposed inside each of the mounting holes 30. A fastener 40 such as the illustrated bolt and nut combination passes through the spacer 38 and clamps the pads 26 of the shroud segment 12 against the inner face of the case 36. The spacer 38 or a separate washer (not shown) may be used to prevent air leakage in or out of the shroud cavity 32 through the mounting holes 30 by providing a close fit between the spacer 38 (or washer) and the shank of the fastener 40, and between the spacer 38 (or washer) and the outer wall 16 of the shroud segment 12. In this particular example, the case 36 includes a flange 42 which projects radially inward and bears against the aft wall 20 of the shroud segment 12. The flange 42 carries an annular "W" seal 44 which reduces leakage between the aft wall 20 and the flange 42. A leaf seal 46 or other circumferential seal of a conventional type is mounted forward of the shroud segment 12 and bears against the forward wall 14. It is noted that FIG. 1 illustrates only one particular mounting configuration, and that the sealing principles and apparatus described herein may be used with any type of shroud segment mounting structure.

Figure 3:
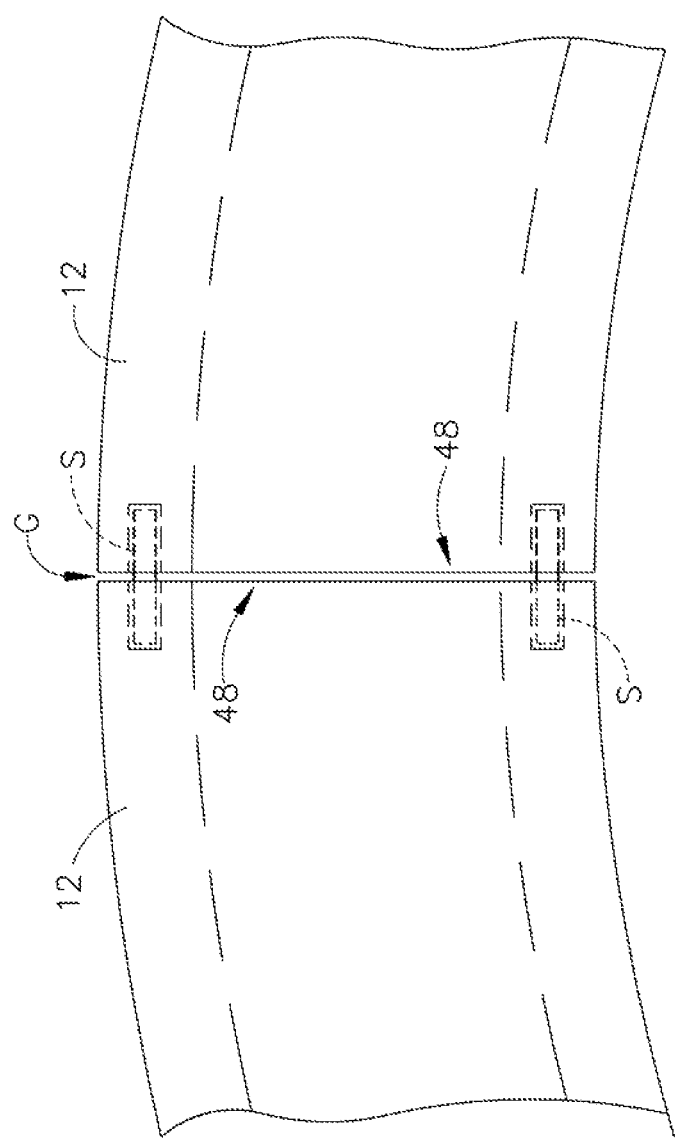
FIG. 3 is a schematic front elevation view of two adjacent shroud segments with a spline seal installed therein.

The shroud segments 12 include opposed end faces 48 (also commonly referred to as "slash" faces). As shown in FIG. 2, each of the end faces 48 lies in a plane parallel to the centerline axis of the engine, referred to as a "radial plane". They may also be oriented to that the plane is at an acute angle to such a radial plane. When assembled and mounted as described above, end gaps are present between the end faces 48 of adjacent shroud segments 12. Accordingly, an array of seals are provided at the end faces 48. Similar seals are generally known as "spline seals" and take the form of thin strips of metal or other suitable material which are inserted in slots in the end faces 48. The spline seals span the gap. FIG. 2 shows only one end of a shroud segment 12, but it will be understood that the opposed end face 48 may be provided with an identical arrangement of slots and spline seals. FIG. 3 is a simplified reference view showing two adjacent shroud segments 12 with a gap "G" between their adjacent end faces 48, and representative spline seals "S" received in slots in the end faces 48 to as to span the gap G. It will be understood that in the following description, when particular "slots" and spline seals are referenced, each of the spline seals is received in corresponding slots in the mating end faces 48 of two adjacent shroud segments 12, so as to span the gap therebetween in the manner shown in FIG. 3.

FIGS. 1 and 2 illustrate the seals used to mitigate leakage through the gaps between the shroud segments 12. It is noted that during engine operation, the area inboard of the dashed line shown in FIG. 1 is exposed to primary flowpath air at a first temperature and total and static pressure. This low-pressure zone is denoted "P1". The area outboard of the dashed line is exposed to secondary flowpath air at a substantially higher static pressure. This high-pressure zone is denoted "P2". In practice the exact location and particular shape of the boundary between the two pressure zones P1 and P2 will vary. In contrast to prior art metallic shroud designs utilizing a separately sealed shroud hanger, the shroud segment 12 itself is exposed to both the high and low-pressure zones P1 and P2.

For this reason, the entire perimeter of the shroud segment 12 is provided with a closed perimeter sealing surface or "full wrap" of seals to limit the pressure inside of the shroud cavity 32. These seals are referred to collectively as a "seal assembly". A generally axially-aligned first slot 50 is formed in the end face 48 along the inner wall 14. An axial inner spline seal 52 is received in the first slot 50.

A generally radially-aligned second slot 54 is formed in the end face 48 along the forward wall 18. An inboard end of the second slot 54 intersects the forward end of the first slot 50. A forward radial spline seal 56 is disposed in the second slot 54. The forward radial spline seal 56 serves two purposes. Within high-pressure zone P2 it limits the leakage into the shroud segment 12. Within the low-pressure zone P1 it limits the leakage from the shroud cavity 32 to the area inboard of the shroud segment 12 and forward of the turbine blade 10, referred to as a leading edge cavity and denoted "LE" in FIG. 1.

A generally radially-aligned third slot 58 is formed in the end face 48 along the aft wall 20. An inboard end of the third slot 58 intersects the aft end of the first slot 50. An aft radial spline seal 60 is disposed in the third slot 58. This seal is used to restrict the leakage from the shroud cavity 32 to the area inboard of the shroud segment 12 and aft of the turbine blade 10, referred to as a trailing edge cavity and denoted "TE" in FIG. 1. The aft radial spline seal 60 may also be aligned with a circumferential seal or case member, such as a portion of the flange 42, in order to restrict leakage flow down the chute aft of the seal 60.

A generally axially-aligned fourth slot 62 is formed in the end face 48 along the outer wall 16. An outer spline seal 64 is received in the fourth slot 62. A generally radially-aligned fifth slot 66 is formed in the end face 48 along the forward wall 14, extending between the second slot 50 and the forward end of the fourth slot 62. A forward outer spline seal 68 is disposed in the fifth slot 66. A generally radially-aligned sixth slot 70 is formed in the end face 48 along the aft wall 20, extending between the third slot 58 and the aft end of the fourth slot 62. An aft outer spline seal 72 is disposed in the sixth slot 70. Collectively, the outer, forward outer, and aft outer spline seals 64, 68, and 72 (referred to as a group as "upper spline seals") limit air leakage into the shroud cavity 32 from the high-pressure region P2.

To reduce "chute" leakage down the slots that receive the spline seals, corner seals similar in construction to the spline seals but having generally L-shaped cross-sections may be installed at the intersections of the various spline seals. As shown in FIG. 2, corner seals 74 and 76 are installed at the junctions of the inner and forward radial spline seals 52 and 56, and the inner and aft radial spline seals 52 and 60, respectively.

The optional rail 28 bears against the leaf seal 46. To discourage endwall leakage past the leaf seal 46 and the rail 28, a generally axially-aligned seventh slot 78 is formed in the end face 48 within the cross-section of the rail 28, intersecting the second slot 54. A forward auxiliary spline seal 80 is received in the seventh slot 78. In general, the auxiliary spline seal 80 should be configured to extend as close to the leaf seal 46 as possible, to limit endwall leakage.

Collectively, the spline seals provide a "full wrap" or continuous sealing surface around the perimeter of the gaps. In operating this will limit air leakage into or out of the shroud segments 12 even in the absence of a conventional pressure-reducing shroud hanger.

The foregoing has described a turbine shroud sealing apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine shroud apparatus surrounding a rotor carrying an array of turbine blades for a gas turbine engine having a centerline axis, comprising:
   (a) an annular turbine case;
   (b) an annular turbine shroud fixedly mounted within and directly abutting the turbine case, comprising a plurality of arcuate shroud segments, each shroud segment comprising a low-ductility material and configured as a hollow box having opposed forward and aft walls, and opposed inner and outer walls, each of the walls extending between opposite end faces, wherein the inner wall of each shroud segment defines an arcuate flowpath surface exposed to and closely surrounding the turbine blades, to thereby define an outer radial flowpath boundary for a hot gas stream flowing through the rotor, and wherein the shroud segments are disposed with mating end faces in close proximity so as to define end gaps between each facing pair of end faces; and
   (c) a seal assembly disposed in each of the end gaps, the seal assembly comprising one or more spline seals which are arranged to define a continuous sealing surface around the perimeters of the mating end faces.

2. The apparatus of claim 1 wherein the seal assembly comprises a plurality of generally planar spline seals disposed in intersecting slots formed in each of the end faces.

3. The apparatus of claim 2 further including at least one corner seal having a generally L-shaped cross-section and disposed at a juncture of two intersecting spline slots.

4. The apparatus of claim 1 wherein each of the end faces includes:
   (a) a first slot in the end face along the inner wall, having a first spline seal received therein;
   (b) a second slot in the end face along the forward wall, having an inboard end which intersects a forward end of the first slot, and having a second spline seal disposed therein;
   (c) a third slot in the end face along the aft wall, having an inboard end which intersects an aft end of the first slot, and having a third spline seal disposed therein;
   (d) a fourth slot in the end face along the outer wall, having a fourth spline seal received therein;
   (e) a fifth slot in the end face along the forward wall, extending between the second slot and a forward end of the fourth slot, having a fifth spline seal disposed therein; and
   (f) a sixth slot in the end face along the aft wall, extending between the third slot and an aft end of the fourth slot, having a sixth spline seal disposed therein.

5. The apparatus of claim 4 wherein the forward wall of the shroud segment includes a rail protruding therefrom; and where the first end face includes a seventh slot in the end face along the inner wall, positioned at the location of the rail and intersecting the second slot, the seventh slot having a seventh spline seal received therein.

6. The apparatus of claim 1 wherein the shroud segment comprises a ceramic matrix composite material.

* * * * *